UNITED STATES PATENT OFFICE.

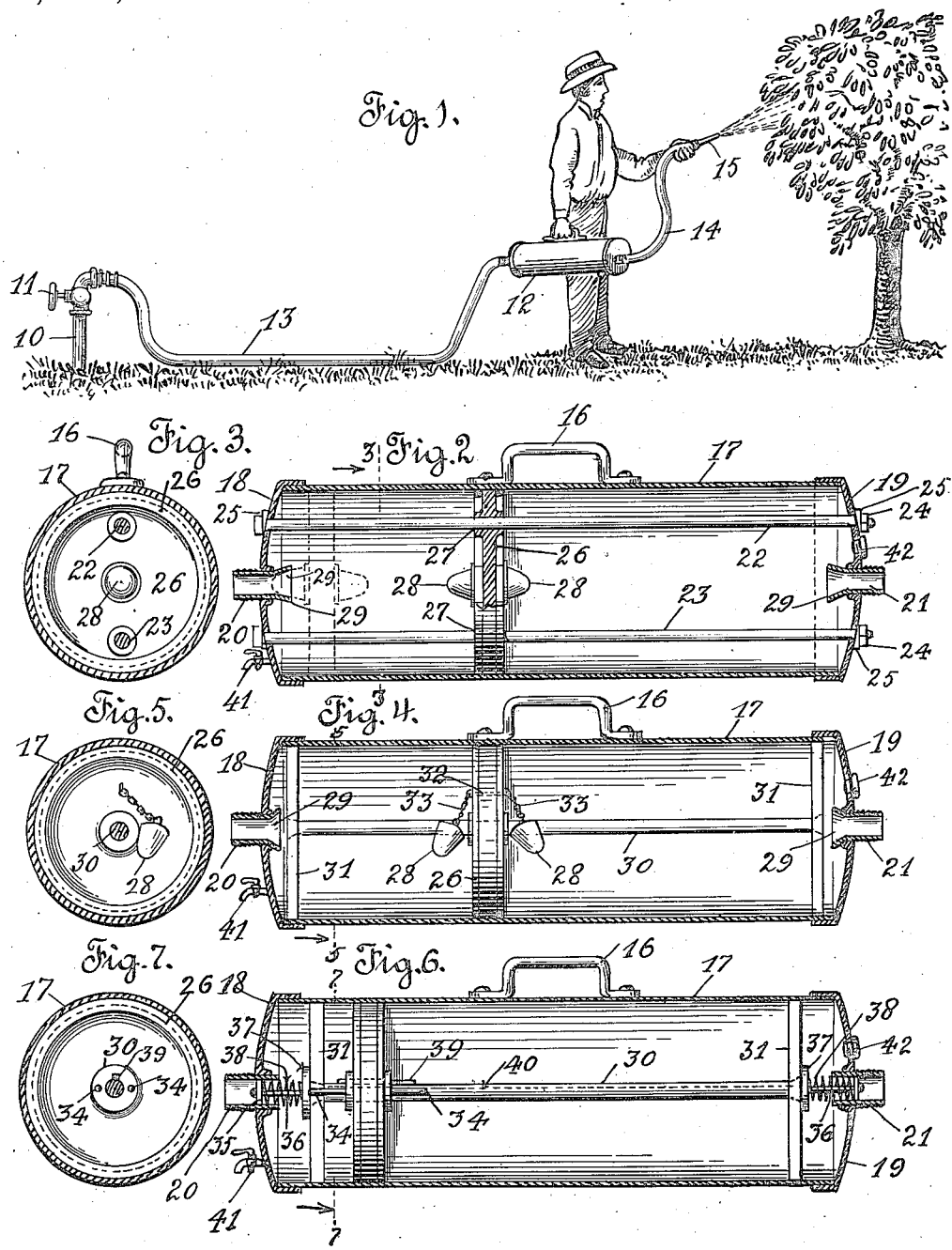

LITTLETON S. BAKER, OF PASADENA, CALIFORNIA.

SPRAYER.

1,169,524.  Specification of Letters Patent.  Patented Jan. 25, 1916.

Application filed June 23, 1915. Serial No. 35,795.

*To all whom it may concern:*

Be it known that I, LITTLETON S. BAKER, a citizen of the United States, residing at Pasadena, in the county of Los Angeles and State of California, have invented new and useful Improvements in Sprayers, of which the following is a specification.

My invention relates to a spraying device operated by the pressure water of a hydrant, and in particular to a spraying device adapted for spraying trees, shrubs, and plants in general with a suitable spraying solution for combating vegetable and insect parasites, but my invention is not limited thereto. The same may also be used for spraying a cleansing liquid or solution into cylinders of internal combustion engines to remove soot and other deposits therefrom and for other purposes, such as spraying liquid paint.

An object of this invention is to devise a sprayer simple of construction, positive in operation, and which will satisfactorily operate even after long usage and wear of the parts composing it.

Another object of this invention is to construct a sprayer having a piston provided with means for forming a fluid tight closure with the outlet when the piston reaches the end of its stroke, whereby the cylinder may be disconnected from the nozzle carrying connection and the water power inlet, enabling the operator to reverse the position of the cylinder in regard to the source of water power and the nozzle connection without leakage from the cylinder. Such leakage would occur unless the piston were made a fluid tight closure with the cylinder walls.

With these and other objects in view which will appear as the description proceeds, my invention consists in the construction and arrangement of parts as hereinafter claimed.

In the following drawings which form a part of this specification: Figure 1 presents a perspective view of the apparatus with the operator using the same. Fig. 2 shows a longitudinal cross section of the hydraulic cylinder. Fig. 3 shows a vertical cross section on the line 3—3 of Fig. 2, looking in the direction of the arrows. Fig. 4 shows a vertical cross section of a modified form of the hydraulic cylinder. Fig. 5 shows a vertical cross section on the line 5—5 of Fig. 4. Fig. 6 shows a longitudinal cross section of another modified form of the hydraulic cylinder. Fig. 7 shows a vertical cross section on the line 7—7 of Fig. 6.

10 represents a hydrant equipped with a valve 11 of any preferred construction. A flexible hose 13 is detachably connected with the hydrant at one end and with a hydraulic cylinder 12 at the other. On the forward end of the cylinder is a short section of the flexible hose 14 detachably connected, said section of hose carrying a spraying nozzle 15 of any desired or preferred construction at its forward end. On the outer periphery of the cylinder a handle 16 is suitably secured by means of which the operator may carry the cylinder conveniently about, as illustrated in Fig. 1.

Referring now to Fig. 2 showing the construction of the hydraulic cylinder, the same consists of a metal casing 17 preferably cylindrical in shape. The casing is closed at its respective ends by heads 18 and 19 secured to said casing in any preferred manner. Centrally located on the respective heads 18—19 are tubular hose connections or necks 20—21 which are externally threaded to receive hose sections 13 and 14, respectively. A pair of fixed piston rods 22—23 extend parallel to the longitudinal axis of the cylinder and pass through heads 18—19, being externally threaded at their outer ends for the reception of nuts 24. Washers 25 of a shape to conform to the curvature of the cylinder heads are interposed between nuts 24 and said heads and form a fluid tight packing for the apertures in the heads through which the fixed piston rods pass. Slidably mounted on said piston rods is a piston 26 constructed of any suitable metal though I prefer aluminum because of its lightness. Moreover it is non-corrodible and not affected by the spraying solutions usually employed. The fixed piston rods pass through apertures 27 in the piston which is provided with a circular flange on opposite sides of said apertures in order to furnish a larger bearing surface for the rods. Centrally located on said piston and on opposite sides thereof are oval shaped plugs 28 made of rubber, or any other suitable material. These plugs are in axial line with the inlet and outlet openings 20 and 21 so that when the piston reaches the extreme end of the stroke the plug adjacent to the outlet will be seated, forming a fluid tight closure preventing any liquid from passing through the outlet. As shown in the drawings, the inlet and outlet are flared as at 29 in order to coöperate with the oval shaped plugs 28 to form a fluid tight closure.

In Figs. 4 and 5 I have shown a modified form of the hydraulic cylinder in which only one fixed piston rod 30 is provided. The same extends along the central longitudinal axis of the cylinder and is mounted at either end in a cross bar 31. Oval shaped plugs 28 are connected with short chains 33 to a pin 32 which passes through the piston at a point adjacent to the piston rod. The length of the chain is such that said plugs are suspended adjacent to the piston rod and when the piston reaches the end of its stroke toward the outlet 21 the suction of the fluid passing through said outlet in connection with the flaring end 29 thereof will cause plug 28 to be seated in said outlet forming a fluid tight closure therefor preventing the escape of any liquid.

Another form of the cylinder is shown in Figs. 6—7. In this construction a central fixed piston rod is provided as in the modification shown in Figs. 4 and 5, with cross bars 31. A pair of pins 34 is provided extending through the piston on opposite sides and adjacent to the piston rod. The inlet and outlet of the cylinder are each provided with a cross bar 35 from which a valve stem 36 extends into the cylinder carrying a valve disk 37 at its outer end. A helical spring 38 interposed between the cross bar 35 and the valve disk holds said disk with yielding pressure against the cross bars 31. When the piston reaches the end of its stroke, pins 34 will contact with the valve disk 37 and hold the same against the valve seat forming a fluid tight closure. In order to insure that the pins 34 will not strike bars 31 during the reciprocal movement of the piston, said piston is provided with a key 39 which rides in a longitudinal key-way 40, thus preventing any rotation of the piston during its reciprocation and effecting that pins 34 clear the cross bars 31.

Operation: When it is desired to start the spraying operations, the hydraulic cylinder is set on end with the tubular neck 21 extending upward and hose 14 being as yet unattached thereto. In this vertical position of the cylinder the piston will slide down the piston rod or rods until it reaches head 18. Then the cylinder is connected to the hydrant by means of hose 13. Now the chemical solution to be used in spraying is poured into tubular neck 21 until the cylinder is filled to the desired extent or the same may be filled with water as just described and the chemicals for making the spraying solution are added thereto. Hose 14 is now attached to the neck 21 and the hydraulic cylinder is vigorously shaken in case the chemicals are added subsequently to the water in order to form a homogeneous mixture. Now valve 11 is opened admitting water under pressure from the hydrant to the hose 13 to the rear end of the casing of the cylinder. Pressure of the water will force the piston toward the forward end of the cylinder and in so doing will force the spraying solution from the forward end through hose 14 and spraying nozzle 15. It should be noted that the force with which the spraying solution leaves the nozzle 15 is substantially equal to the force with which water directly coming from the hydrant 10 would leave said spraying nozzle if no cylinder had been interposed between nozzle 15 and hydrant 10. The energy required for moving the piston from one end of the cylinder to the other is practically negligible. When the piston has reached the end of its stroke the plug 28 will seat in the flared end of the outlet 21 preventing any escape of liquid through said opening. In the modification shown in Figs. 6—7 the valve disk will be held against its seat. Now valve 11 is closed and hose 14 and 13 are detached from the cylinder 12, care being taken to first set the cylinder on its forward end so as to prevent the water in the cylinder from flowing out through neck 20. Hose 13 is now connected to neck 21 and chemicals for making the spraying solution are introduced through neck 20. Hose 14 is now attached to neck 20, the cylinder is vigorously shaken and the spraying proceeds as before.

It is unnecessary to construct a fluid tight piston, and a perfectly true cylinder. To do so would increase materially the cost of manufacture, without any compensating advantage; on the contrary, such fluid tight construction would increase the friction between said parts considerably, and thus diminish the pressure with which the spraying solution would leave the nozzle. Again, in time, said parts would become worn, even if fluid tight when new, but if there is even a slight leakage between the piston and the cylinder, the water from the hydrant would flow past the piston and would be sprayed out, and the operator would have no ready means of knowing whether the apparatus is spraying water or the original spraying solution.

The provision of the piston operated valve for positively closing the outlet when the piston reaches the end of its stroke is the principal object of this invention. When the sprayer stops spraying the operator knows positively that the spraying solution is used up, and that the piston has reached the end of its stroke.

It is not necessary to reverse the hose connections as just described in the case where the cylinder is provided with an outlet valve 41 in head 18. When the cylinder is equipped with such valve and the piston has reached its forward stroke, hydrant valve 11 is now closed and outlet valve 41 is opened after setting the cylinder on its head 18. The water between the piston and head 18 will now flow out through valve 41 and the piston will slide down to head 18. Valve 41 is now closed and another spraying solution is introduced through tubular neck 21. In this manner the forward end can be used again for the introduction of another spraying solution through tubular neck 21 and after the connection of hose 14 and opening hydrant valve 11 the spraying operation will proceed as before.

The provision of outlet valve 41 is especially useful when it is desired to use the sprayer for cleansing the cylinders of an internal combustion engine. The cleansing fluid used for that purpose is usually a hydro-carbon such as petroleum distillate. In this case the distillate is introduced each time through neck 21 and the motive fluid through neck 20, valve 41 exhausting the motive fluid on the end of the forward stroke of the piston. A feed opening 42 with a screw cap therefor is provided on head 19 through which a spraying solution may be introduced without removing hose 14.

The hose 13 may be dispensed with and the hydraulic cylinder detachably connected to the hydrant 10 direct. Such arrangement will obviate the carrying about of the cylinder but will require a hose connection 14 of a length sufficient to enable the operator to reach the objects to be sprayed.

While I have shown the sprayer in a horizontal position during its operation, it may be preferred to set the same on end so that the pressure water enters at the top. In this position the weight of the piston will assist the pressure water in forcing the spraying solution through the nozzle.

I claim:

1. A sprayer comprising a tubular casing, a cap disposed on one end thereof for closing the same, a threaded nipple carried by said cap, whereby the sprayer may be attached to a hose, a cap disposed on the opposite end of said casing, a threaded nipple carried by said last-named cap whereby the spraying nozzle may be connected with said sprayer, a piston reciprocating between the ends of said casing, a pair of valves attached to said piston on opposite sides thereof, a pair of valve seats on the inner ends of said nipples coöperating with said valves, and a pair of closable apertures in said caps.

2. A sprayer comprising a cylinder, a cap on one end thereof for closing the same, a threaded nipple carried by said cap, whereby the sprayer may be attached to a hose, a cap disposed on the opposite end of said cylinder, a threaded nipple carried by said last-named cap whereby a spraying nozzle may be connected with said sprayer, a piston reciprocating between the ends of said cylinder, and a pair of valves attached to said piston on opposite sides thereof for closing the inner ends of said nipples.

3. A sprayer comprising a cylinder, a cap disposed on one end of said cylinder for closing the same, a threaded nipple carried by said cap whereby the sprayer may be attached to a hose, a cap disposed on the opposite end of said cylinder, a threaded nipple carried by said last-named cap whereby a spraying nozzle may be connected with said sprayer, a piston reciprocating between the ends of said cylinder, and a pair of valves on opposite sides of said piston and operated by the latter for closing the inner ends of said nipples.

In testimony whereof I have signed my name to this specification.

LITTLETON S. BAKER.